UNITED STATES PATENT OFFICE.

CAMILLE LEON CHARLES BERTOU, OF PARIS, FRANCE.

PROCESS OF RECOVERING TIN FROM SCRAPS AND WASTE OF TIN-PLATE.

SPECIFICATION forming part of Letters Patent No. 477,348, dated June 21, 1892.

Application filed April 28, 1891. Serial No. 390,828. (No specimens.) Patented in France August 1, 1890, No. 207,359.

*To all whom it may concern:*

Be it known that I, CAMILLE LEON CHARLES BERTOU, of Paris, in the Republic of France, have invented a new and useful Improvement in the Process of Recovering Tin and Iron from Scraps and Waste of Tin-Plate, (for which I have obtained Brevet d'Invention in France, No. 207,359, dated August 1, 1890,) of which the following is a specification.

My invention relates to the treatment of scraps and waste of tin-plate for the recovery of the tin and iron therefrom by dissolving the tin by means of hydrochloric acid, with the addition of an oxidizing agent to facilitate the combustion of the hydrogen of the hydrochloric acid and the union of its chlorine with the tin to form chloride of tin.

In the present specification I will take as example scraps or waste of tin-plate; but it will be understood that the same process is applicable to the extraction of tin from other matters which contain it.

My improvement is characterized by the nature and relative proportions of the matters employed and by the conditions under which these matters act, as well as by the course followed for the operations.

I employ as oxidizing agents suitable to aid the action of the hydrochloric acid the nitrates known in the arts, such as nitrate of soda. These salts are employed under the special conditions which I am about to indicate and in the strict proportions deduced from the reactions,

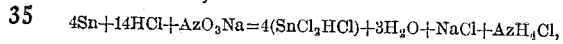

except a slight excess of hydrochloric acid, which is indispensable to compensate for accidental loss and maintain the acidity of the liquors. I first dissolve the nitrate necessary to untin one ton, for example, of scraps in about one hundred and twenty-five gallons of water. Then I add the hydrochloric acid and mix them, the proportions of the nitrate being about six per cent. of the acid. The solution thus prepared is heated to 50° centigrade as a maximum. It is essential not to bring the liquid, at least at the beginning, to a high temperature—80° to 100° centigrade, for example—and not to employ an excess of reagents. In fact, an immediate elevation of the temperature would provoke the elimination of a large proportion of the reagents by evaporation or decomposition. The bath having been thus prepared, I place in it a first charge of scraps or waste. When this charge is untinned, I take out the black iron and introduce a new charge of scraps into the bath, and so on, slightly and progressively raising the temperature of the bath to stimulate the dissolution, to which there is no objection, as the liquor becomes weaker and weaker in nitrate.

The liquors resulting from the above operation may be recharged with hydrochloric acid and oxidizing agents and give place to a new operation entirely similar to the first, which recharging and new operations may be repeated until it is judged that the liquid is sufficiently saturated with tin for the purpose for which it is destined. Then the liquors having been spent upon the scraps may be treated by electrolysis or other suitable means to extract the tin.

The operations which I have just described should be conducted with the greatest care, for if the liquors are heated at the beginning to a too high temperature, especially in presence of an excess of reagents, the attack becomes so severe that not only is the coating of the tin dissolved, but a considerable proportion of the iron is dissolved also, while at the same time a part of the acid reagents is eliminated in the form of gas or of vapor into the atmosphere. My process is thus characterized not only by the employment of oxidizing agents, which are more economical in facilitating the attack of the tin by the hydrochloric acid, but also by the mode of operation, which, followed scrupulously, gives very good results.

The nitrate introduced into the dissolving bath has the same effect therein even though that bath should contain chloride of iron. It thus matters little if there should be in the bath some perchloride which results from a commencement of attack of the iron or some which may have been added on purpose.

The employment of nitrates as oxidizing agents presents always the advantage of leading to the formation in the bath of salts which render them better conductors of electricity, which is important if it be desired to precipitate the tin by electrolysis.

When it is desired to separate the tin from other metals which accompany it in the baths, I precipitate it in the state of oxide by any suitable means, though I prefer to employ for such precipitation the process which is the subject of my application for United States Letters Patent, Serial No. 429,199, filed April 14, 1892. The percipitated oxide may be transformed into metal by any known or suitable means.

What I claim as my invention, and desire to secure by Letters Patent, is—

The improvement in the art of recovering tin from scraps and waste of tin-plate, consisting in first placing the scraps or waste in a bath of a temperature of about 50° centigrade, composed of hydrochloric acid and a nitrate, in which the proportion of the nitrate is about six per cent., by weight, of the acid, then adding more of the scraps or waste in successive charges, and in the meantime gradually raising the temperature of the bath to a point not exceeding 90° centigrade as it becomes more and more saturated with tin and weaker in the nitrate, substantially as herein set forth.

CAMILLE LEON CHARLES BERTOU.

Witnesses:
  ALCIDE FABE,
  HENRI URIESSE.